(12) United States Patent
Rudolf et al.

(10) Patent No.: US 7,941,151 B2
(45) Date of Patent: May 10, 2011

(54) METHOD AND SYSTEM FOR PROVIDING CHANNEL ASSIGNMENT INFORMATION USED TO SUPPORT UPLINK AND DOWNLINK CHANNELS

(75) Inventors: Marian Rudolf, Montreal (CA);
Stephen G. Dick, Nesconset, NY (US);
Phillip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/709,970

(22) Filed: Feb. 23, 2007

(65) Prior Publication Data
US 2007/0173262 A1   Jul. 26, 2007

Related U.S. Application Data

(63) Continuation of application No. 10/902,704, filed on Jul. 29, 2004, now Pat. No. 7,200,405.

(60) Provisional application No. 60/523,049, filed on Nov. 18, 2003.

(51) Int. Cl.
*H04W 72/00* (2009.01)
(52) U.S. Cl. ............... 455/450; 455/451; 455/452.1
(58) Field of Classification Search ............ 455/450
See application file for complete search history.

(56) References Cited

U.S. PATENT DOCUMENTS

| | | | |
|---|---|---|---|
| 5,142,539 A | 8/1992 | Dahlin et al. | |
| 5,301,247 A | 4/1994 | Rasmussen et al. | |
| 5,355,412 A | 10/1994 | Kangas | |
| 5,357,525 A | 10/1994 | Moriue et al. | |
| 5,390,197 A | 2/1995 | MacDonald et al. | |
| 5,404,355 A | 4/1995 | Raith | |
| 5,659,569 A | 8/1997 | Padovani et al. | |
| 5,689,518 A | 11/1997 | Galand et al. | |
| 5,722,077 A | 2/1998 | Kanai | |
| 5,845,212 A | 12/1998 | Tanaka | |

(Continued)

FOREIGN PATENT DOCUMENTS
CA    2374815    12/2000
(Continued)

OTHER PUBLICATIONS

Mouly et al. "Chapter 4, The Radio Interface," The GSM System for Mobile Communications; 1992, pp. 186-259.

(Continued)

*Primary Examiner* — David Q Nguyen
(74) *Attorney, Agent, or Firm* — Volpe and Koenig, P.C.

(57) ABSTRACT

A method and wireless communication system for providing channel assignment information used to support an uplink (UL) channel and a downlink (DL) channel. The system includes at least one Node-B and at least one wireless transmit/receive unit (WTRU). The WTRU communicates with the Node-B via a common control channel, the UL channel and the DL channel. The WTRU receives a message from the Node-B via the common control channel. The message includes an indication of whether the message is intended for assigning radio resources to the UL channel or the DL channel. The WTRU determines whether the message is intended for the WTRU and, if so, the WTRU determines whether the message is for assigning radio resources to the UL channel or the DL channel. The WTRU takes an appropriate action based on whether the message is for assigning radio resources to the UL channel or the DL channel.

58 Claims, 2 Drawing Sheets

U.S. PATENT DOCUMENTS

| | | | |
|---|---|---|---|
| 5,917,810 | A | 6/1999 | De Bot |
| 5,917,840 | A | 6/1999 | Cheney et al. |
| 5,930,706 | A | 7/1999 | Raith |
| 6,005,871 | A | 12/1999 | Petersen et al. |
| 6,134,597 | A | 10/2000 | Rieth et al. |
| 6,172,971 | B1 | 1/2001 | Kim |
| 6,201,811 | B1 | 3/2001 | Larsson et al. |
| 6,424,632 | B1 | 7/2002 | Poret et al. |
| 6,430,163 | B1 | 8/2002 | Mustajarvi et al. |
| 6,735,185 | B1 | 5/2004 | Noneman |
| 6,850,509 | B2 | 2/2005 | Lee et al. |
| 6,859,445 | B1 | 2/2005 | Moon et al. |
| 6,882,727 | B1 | 4/2005 | Vialen et al. |
| 6,901,104 | B1 * | 5/2005 | Du et al. ............... 375/142 |
| 6,915,473 | B2 | 7/2005 | Bolourchi et al. |
| 6,928,066 | B1 | 8/2005 | Moon et al. |
| 7,054,633 | B2 | 5/2006 | Seo et al. |
| 7,079,848 | B2 | 7/2006 | Das et al. |
| 7,181,298 | B1 | 2/2007 | Yoshio et al. |
| 7,184,447 | B1 | 2/2007 | Koo et al. |
| 7,200,788 | B2 | 4/2007 | Hiraki et al. |
| 7,366,105 | B2 | 4/2008 | Yi et al. |
| 7,394,799 | B2 | 7/2008 | Li et al. |
| 7,558,228 | B2 | 7/2009 | Lee et al. |
| 7,693,110 | B2 | 4/2010 | Love et al. |
| 7,783,953 | B2 | 8/2010 | Bolourchi et al. |
| 2002/0051431 | A1 | 5/2002 | Choi et al. |
| 2002/0093918 | A1 | 7/2002 | Kim et al. |
| 2002/0181422 | A1 * | 12/2002 | Parantainen et al. ......... 370/337 |
| 2003/0219037 | A1 * | 11/2003 | Toskala et al. ............... 370/496 |
| 2004/0043783 | A1 | 3/2004 | Anderson |
| 2004/0085939 | A1 | 5/2004 | Boumendil et al. |
| 2004/0085989 | A1 | 5/2004 | Boumendil et al. |
| 2010/0318886 | A1 | 12/2010 | Bolourchi et al. |

FOREIGN PATENT DOCUMENTS

| | | |
|---|---|---|
| DE | 19855242 | 5/2000 |
| EP | 1006670 | 6/2000 |
| EP | 1248476 | 10/2002 |
| EP | 1324500 | 12/2002 |
| EP | 1324500 | 7/2003 |
| EP | 1351424 | 10/2003 |
| GB | 2382956 | 12/2001 |
| GB | 2383956 | 12/2001 |
| GB | 2372409 | 8/2002 |
| JP | 01-196774 | 8/1989 |
| JP | 05-236073 | 9/1993 |
| JP | 08-316967 | 11/1996 |
| JP | 11-136138 | 5/1999 |
| JP | 11-196070 | 7/1999 |
| TW | 276382 | 5/1996 |
| TW | 276382 | 9/2005 |
| WO | 99/38076 | 7/1999 |
| WO | 00/21210 | 4/2000 |
| WO | 00/28763 | 5/2000 |
| WO | 00/30378 | 5/2000 |
| WO | 00/57660 | 9/2000 |
| WO | 01/01609 | 1/2001 |
| WO | 01/05050 | 1/2001 |
| WO | 02/51177 | 6/2002 |
| WO | 02/096030 | 11/2002 |

OTHER PUBLICATIONS

3GPP TSG RAN WG Tdoc R1-02-0018, Nokia, "Compact Signalling of Multi-code Allocation for HSDPA, version 2," Espoo, Finland, Jan. 2002.

3GPP TSG RAN WG 1 Tdoc R1-02-1277, Noika, "Two Threshold Node B Packet Scheduling," Shanghai, China, Nov. 2002.

3GPP TSG RAN WG 1 Tdoc R1-02-1350, Motorola, "Design Considerations for Enhanced Uplink Dedicated Channel," Shanghai, China, Nov. 2002.

3GPP TSG RAN WG 1 Tdoc R1-02-1277, Nokia, "Two Threshold Node B Packet Scheduling," Shanghai, China, Nov. 2002.

Third Generation Partnership Project, "Technical Specification Group Radio Access Network; Feasibility Study for Enhanced Uplink for UTRA FDD (Release 6)," 3GPP TR 25.896 V1.0.2 (Oct. 2003).

Third Generation Partnership Project, "Technical Specification Group Radio Access Network; Feasibility Study for Enhanced Uplink for UTRA FDD (Release 6)," 3GPP TR 25.896 V6.0.0 (Mar. 2004).

"DL Control Channel Structures for Parameters Sent Simultaneously With HS-DSCH TTI." TSG-RAN WG1/WG2 Adhoc on HSDPA, Sophia Antipolis, France, (Apr. 5-6, 2001).

Balachandran et al., "Design of a Medium Access Control Feedback Mechanism for Cellular TDMA Packet Data Systems", IEEE Journal on Selected Areas in Communications, vol. 18, No. 9, pp. 1719-1730, (Sep. 2000).

Gourgue, "Air Interface of the Future European Fully Digital Trunk Radio System", Proceedings of the Vehicular Technology Conference, vol. CONF. 43, pp. 714-717 (May 1993).

Interdigital Communication Corporation, "Implicit UE Identification for HSDPA Downlink Signaling", TDOC R1-01-0810, 3GPP RAN WG1 Meeting 22, (Aug. 2001), available at: http://www.3goo.org/ftp.tsg_ran/WG1_RL1.

Interdigital, "Updated Recommendation for UE-specific CRC", TDOC R1-01-1066, 3GPP TSG RAN WG 1 AD HOC Meeting On HSDPA, (Nov. 2001), available at http://www.3gpp.org/ftp/tsg_ran/WG1_RL1.

Motorola, "Control Channel Structure for High Speed DSCH (HS-DSCH)," TSGR1#16(00) 1242, R2-12A010021, pp. 1-5 (Apr. 5-6, 2001).

Third Generation Partnership Project, "Technical Specification Group Radio Access Network; High Speed Downlink Packet Access; Overall UTRAN Description (Release 5)," 3GPP TR 25.855 v0.0.3; (May 2001).

Third Generation Partnership Project, "Technical Specification Group Radio Access Network; Feasibility Study for Enhanced Uplink for UTRA FDD (Release 6)," 3GPP TR 25.896 V1.0.1, pp. 16-21 (Oct. 2003).

Third Generation Partnership Project, "Technical Specification Group Radio Access Network; High Speed Downlink Packet Access; Overall UTRAN Description (Release 5)," 3GPP TR 25.855 V5.0.0 (Sep. 2001).

Third Generation Partnership Project, "Technical Specification Group Radio Access Network; Multiplexing and channel coding (FDD) (Release 1999)," 3GPP TS 25.212 V3.5.0 (Dec. 2000).

Third Generation Partnership Project, "Technical Specification Group Radio Access Network; Multiplexing and channel coding (FDD) (Release 1999)," 3GPP TS 25.212 V3.7.0 (Sep. 2001).

Third Generation Partnership Project, "Technical Specification Group Radio Access Network; Multiplexing and channel coding (FDD) (Release 4)," 3GPP TS 25.212 V4.2.0 (Sep. 2001).

Third Generation Partnership Project, "Technical Specification Group Radio Access Network; Multiplexing and channel coding (TDD) (Release 1999)," 3GPP TS 25.222 V3.6.0 (Mar. 2001).

Third Generation Partnership Project, "Technical Specification Group Radio Access Network; Multiplexing and channel coding (TDD) (Release 4)," 3GPP TS 25.222 V4.0.0 (Mar. 2001).

Third Generation Partnership Project, "Technical Specification Group Radio Access Network; Multiplexing and channel coding (TDD) (Release 4)," 3GPP TS 25.222 V4.1.0 (Sep. 2001).

Third Generation Partnership Project, "Technical Specification Group Radio Access Network; Multiplexing and channel coding (TDD) (Release 1999)," 3GPP TS 25.222 V3.7.0 (Sep. 2001).

Third Generation Partnership Project, "Technical Specification Group Radio Access Network; UTRAN Overall Description (Release 1999)," 3GPP TS 25.401 V3.6.0 (Mar. 2001).

Third Generation Partnership Project, "Technical Specification Group Radio Access Network; UTRAN Overall Description (Release 1999)," 3GPP TS 25.401 V3.8.0 (Sep. 2001).

Third Generation Partnership Project, "Technical Specification Group Radio Access Network; UTRAN Overall Description (Release 4)," 3GPP TS 25.401 V4.0.0 (Mar. 2001).

Third Generation Partnership Project, "Technical Specification Group Radio Access Network; UTRAN Overall Description (Release 4)," 3GPP TS 25.401 V4.2.0 (Sep. 2001).

Third Generation Partnership Project, "Technical Specification Group Radio Access Network; UTRAN Overall Description (Release 5)," 3GPP TS 25.401 V5.1.0 (Sep. 2001).

Third Generation Partnership Project, "Technical Specification Group Radio Access Network; UTRA High Speed Downlink Packet Access (HSDPA); Overall Description; Stage 2 (Release 5)," 3GPP TS 25.308 V5.0.0 (Sep. 2001).

Third Generation Partnership Project, "Technical Specification Group Radio Access Network; Physical channels and mapping of transport channels onto physical channels (TDD) (Release 1999)," 3GPP TS 25.221 V3.6.0 (Mar. 2001).

Third Generation Partnership Project, "Technical Specification Group Radio Access Network; Physical channels and mapping of transport channels onto physical channels (TDD) (Release 1999)," 3GPP TS 25.221 V3.8.0 (Sep. 2001).

Third Generation Partnership Project, "Technical Specification Group Radio Access Network; Physical channels and mapping of transport channels onto physical channels (TDD) (Release 4)," 3GPP TS 25.221 V4.0.0 (Mar. 2001).

Third Generation Partnership Project, "Technical Specification Group Radio Access Network; Physical channels and mapping of transport channels onto physical channels (TDD) (Release 4)," 3GPP TS 25.221 V4.2.0 (Sep. 2001).

Third Generation Partnership Project, "Technical Specification Group Radio Access Network; Physical Layer Procedures (FDD) (Release 1999)," 3GPP TS 25.214 v3.6.0 (Mar. 2001).

Third Generation Partnership Project, "Technical Specification Group Radio Access Network; Physical Layer Procedures (FDD) (Release 1999)," 3GPP TS 25.214 v3.8.0 (Sep. 2001).

Third Generation Partnership Project, "Technical Specification Group Radio Access Network; Physical Layer Procedures (FDD) (Release 4)," 3GPP TS 25.214 v4.0.0 (Mar. 2001).

Third Generation Partnership Project, "Technical Specification Group Radio Access Network; Physical Layer Procedures (FDD) (Release 4)," 3GPP TS 25.214 v4.2.0 (Sep. 2001).

Third Generation Partnershp Project, "Technical Specification Group Radio Access Network; Multiplexing and channel coding (FDD) (Release 4)," 3GPP TS 25.212 V4.0.0 (Dec. 2000).

3rd Generation Partnership Project; Technical Specification Group Radio Access Network; Multiplexing and channel coding (Release 8); 3GPP TS 36.212 V0.2.1 (Nov. 2006).

3rd Generation Partnership Project; Technical Specification Group Radio Access Network; Physical layer procedures (Release 8); 3GPP TS 36.213 V0.2.1 (Oct. 2006).

Third Generation Partnership Project, "Technical Specification Group Radio Access Network; Multiplexing and channel coding (FDD) (Release 1999)," 3GPP TS 25.212 V3.11.0 (Sep. 2002).

Third Generation Partnership Project, "Technical Specification Group Radio Access Network; Multiplexing and channel coding (FDD) (Release 4)," 3GPP TS 25.212 V4.6.0 (Sep. 2002).

Third Generation Partnership Project, "Technical Specification Group Radio Access Network; Multiplexing and channel coding (FDD) (Release 5)," 3GPP TS 25.212 V5.6.0 (Sep. 2003).

Third Generation Partnership Project, "Technical Specification Group Radio Access Network; Multiplexing and channel coding (FDD) (Release 5)," 3GPP TS 25.212 V5.9.0 (Jun. 2004).

Third Generation Partnership Project, "Technical Specification Group Radio Access Network; Multiplexing and channel coding (FDD) (Release 6)," 3GPP TS 25.212 V6.2.0 (Jun. 2004).

Third Generation Partnership Project, "Technical Specification Group Radio Access Network; Multiplexing and channel coding (TDD) (Release 1999)," 3GPP TS 25.222 V3.10.0 (Sep. 2002).

Third Generation Partnership Project, "Technical Specification Group Radio Access Network; Multiplexing and channel coding (TDD) (Release 4)," 3GPP TS 25.222 V4.6.0 (Dec. 2002).

Third Generation Partnership Project, "Technical Specification Group Radio Access Network; Multiplexing and channel coding (TDD) (Release 4)," 3GPP TS 25.222 V4.7.0 (Dec. 2003).

Third Generation Partnership Project, "Technical Specification Group Radio Access Network; Multiplexing and channel coding (TDD) (Release 5)," 3GPP TS 25.222 V5.5.0 (Jun. 2003).

Third Generation Partnership Project, "Technical Specification Group Radio Access Network; Multiplexing and channel coding (TDD) (Release 5)," 3GPP TS 25.212 V5.6.0 (Dec. 2003).

Third Generation Partnership Project, "Technical Specification Group Radio Access Network; Multiplexing and channel coding (TDD) (Release 6)," 3GPP TS 25.222 V6.0.0 (Dec. 2003).

Third Generation Partnership Project, "Technical Specification Group Radio Access Network; UTRAN Overall Description (Release 1999)," 3GPP TS 25.401 V3.10.0 (Jun. 2002).

Third Generation Partnership Project, "Technical Specification Group Radio Access Network; UTRAN Overall Description (Release 4)," 3GPP TS 25.401 V4.6.0 (Dec. 2002).

Third Generation Partnership Project, "Technical Specification Group Radio Access Network; UTRAN Overall Description (Release 5)," 3GPP TS 25.401 V5.6.0 (Jun. 2003).

Third Generation Partnership Project, "Technical Specification Group Radio Access Network; UTRAN Overall Description (Release 5)," 3GPP TS 25.401 V5.8.0 (Jun. 2004).

Third Generation Partnership Project, "Technical Specification Group Radio Access Network; UTRAN Overall Description (Release 6)," 3GPP TS 25.401 V6.1.0 (Jun. 2003).

Third Generation Partnership Project, "Technical Specification Group Radio Access Network; UTRAN Overall Description (Release 6)," 3GPP TS 25.401 V6.3.0 (Jun. 2004).

Third Generation Partnership Project, "Technical Specification Group Radio Access Network; UTRA High Speed Downlink Packet Access (HSDPA); Overall Description; Stage 2 (Release 5)," 3GPP TS 25.308 V5.4.0 (Mar. 2003).

Third Generation Partnership Project, "Technical Specification Group Radio Access Network; UTRA High Speed Downlink Packet Access (HSDPA); Overall Description; Stage 2 (Release 5)," 3GPP TS 25.308 V5.5.0 (Mar. 2004).

Third Generation Partnership Project, "Technical Specification Group Radio Access Network; UTRA High Speed Downlink Packet Access (HSDPA); Overall Description; Stage 2 (Release 6)," 3GPP TS 25.308 V6.1.0 (Mar. 2004).

Third Generation Partnership Project, "Technical Specification Group Radio Access Network; Physical channels and mapping of transport channels onto physical channels (TDD) (Release 1999)," 3GPP TS 25.221 V3.11.0 (Sep. 2002).

Third Generation Partnership Project, "Technical Specification Group Radio Access Network; Physical channels and mapping of transport channels onto physical channels (TDD) (Release 4)," 3GPP TS 25.221 V4.7.0 (Dec. 2002).

Third Generation Partnership Project, "Technical Specification Group Radio Access Network; Physical channels and mapping of transport channels onto physical channels (TDD) (Release 5)," 3GPP TS 25.221 V5.5.0 (Jun. 2003).

Third Generation Partnership Project, "Technical Specification Group Radio Access Network; Physical channels and mapping of transport channels onto physical channels (TDD) (Release 6)," 3GPP TS 25.221 V6.1.0 (Jun. 2004).

Third Generation Partnership Project, "Technical Specification Group Radio Access Network; Physical Layer Procedures (FDD) (Release 1999)," 3GPP TS 25.214 v3.12.0 (Mar. 2003).

Third Generation Partnership Project, "Technical Specification Group Radio Access Network; Physical Layer Procedures (FDD) (Release 4)," 3GPP TS 25.214 v4.6.0 (Mar. 2003).

Third Generation Partnership Project, "Technical Specification Group Radio Access Network; Physical Layer Procedures (FDD) (Release 5)," 3GPP TS 25.214 v5.6.0 (Sep. 2003).

Third Generation Partnership Project, "Technical Specification Group Radio Access Network; Physical Layer Procedures (FDD) (Release 5)." 3GPP TS 25.214 v5.9.0 (Jun. 2004).

* cited by examiner

METHOD AND SYSTEM FOR PROVIDING CHANNEL ASSIGNMENT INFORMATION USED TO SUPPORT UPLINK AND DOWNLINK CHANNELS

CROSS REFERENCE TO RELATED APPLICATION

This application is a continuation of U.S. patent application Ser. No. 10/902,704, filed Jul. 29, 2004 now U.S. Pat. No. 7,200,405, which claims the benefit of U.S. Provisional Application No. 60/523,049 filed on Nov. 18, 2003, which is incorporated by reference as if fully set forth.

FIELD OF INVENTION

The present invention is related to a wireless communication system. More particularly, the present invention is related to a method and system for providing channel assignment information to support uplink and downlink transmissions.

BACKGROUND

High speed downlink packet access (HSDPA) has been developed to increase downlink (DL) efficiency and throughput in universal mobile telecommunication system (UMTS) Release 5 (R5) wideband code division multiple access (W-CDMA) systems. The key advantages of HSDPA as compared to UMTS R99/R4 are fast and dynamic link adaptation in the DL and a fast layer 1 hybrid automatic repeat request (H-ARQ). Fast link adaptation is achieved by fast scheduling DL transmissions in a base station, coupled with fast layer 1 DL signaling channels. The signaling channel, a high speed shared control channel (HS-SCCH), conveys radio resource allocation information to a plurality of wireless transmit/receive units (WTRUs).

In frequency division duplex (FDD), an HS-SCCH is sent by means of a spreading factor (SF)=128 channelization code during a three (3) time slot transmission time interval (TTI). The HS-SCCH indicates that data would be transmitted to a WTRU on a high speed downlink shared channel (HS-DSCH) after a particular time offset. The HS-SCCH carries the following information: 1) channelization-code-set information (7 bits); 2) modulation scheme information (1 bit); 3) transport-block size information (6 bits); 4) H-ARQ process information (3 bits); 5) redundancy and constellation version (3 bits); 6) new data indicator (1 bit); and 7) a WTRU identity (16 bits).

The HS-SCCH is sent over three (3) time slots (2 ms TTI), but consists of two (2) fields. Field 1 (first time slot) contains channelization code mapping and modulation format information; and field 2 (second and third time slots) contains transport block size, H-ARQ information, redundancy version and a new data indicator along with a WTRU-specific cyclic redundancy check (CRC).

Alternatively, an enhanced uplink (EU) increases uplink (UL) efficiency and throughput. H-ARQ and Node-B scheduling is part of the EU. Similar to an HSDPA, a new shared DL control channel for EU operation provides fast and dynamic allocation of UL radio resources for UL transmissions. The shared DL control channel for the EU needs to ensure low allocation latencies and efficient radio resources management for UL transmissions. Hereinafter, the shared DL control channel for the purposes of an EU is simply referred to as a UL resource assignment channel.

In order to implement an EU along with an HSDPA, another UL resource assignment channel for the EU could be introduced on top of an existing HS-SCCH for an HSDPA. Thus, it is possible to introduce a separate set of SF=128 DL channels as UL resource assignment channels. With this approach, a WTRU would be required to monitor one or more UL resource assignment channels in addition to the HS-SCCHs for an HSDPA operation. Although this approach is conceptually simple, there are many disadvantages with this scheme, such as WTRU complexity, WTRU battery efficiency, and DL spreading code usage.

Therefore, an efficient EU channel assignment scheme is necessary for supporting both an EU and an HSDPA operation.

SUMMARY

In one embodiment, the present invention is a method and wireless communication system for providing channel assignment information for supporting a UL channel and a DL channel. The system includes at least one Node-B and at least one WTRU. The WTRU communicates with the Node-B via a common control channel, the UL channel and the DL channel. The WTRU receives a message from the Node-B via the common control channel. The message includes an indication of whether the message is intended for assigning radio resources to the UL channel or the DL channel. The WTRU determines whether the message is intended for the WTRU and, if so, the WTRU determines whether the message is for assigning radio resources to the UL channel or the DL channel. The WTRU takes an appropriate action based on whether the message is for assigning radio resources to the UL channel or the DL channel.

In another embodiment, the present invention is a method and time-slotted wireless communication system. The system includes at least one Node-B, a radio network controller (RNC) which controls the Node-B, and at least one WTRU which communicates with the Node-B via a common control channel, a UL channel and a DL channel. The RNC transmits a message to the WTRU indicating which time slot TTIs support UL channel transmissions and which time slot TTIs support DL channel transmissions.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Figure 1:
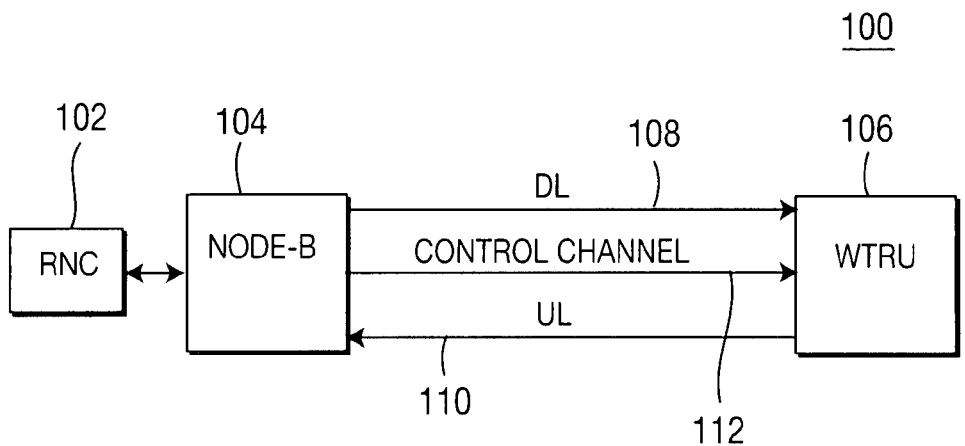
FIG. 1 is a block diagram of a wireless communication system operating in accordance with the present invention.

The present invention will be described with reference to the drawing figures wherein like numerals represent like elements throughout.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The present invention is applicable to any type of wireless communication systems such as UMTS-time division duplex (TDD) and FDD, time division synchronous code division multiple access (TDSCDMA), code division multiple access 2000 (CDMA 2000), and CDMA in general or any other type of wireless communication system.

The features of the present invention may be incorporated into an integrated circuit (IC) or be configured in a circuit comprising a multitude of interconnecting components.

The present invention will be described in reference to an HSDPA and an EU, and the terms HSDPA and EU are used interchangeably with DL and UL, respectively. However, it should be understood that the reference to an HSDPA and an EU is just for describing the preferred embodiment of the present invention, and the teachings of the present invention may be applied to any system for utilizing a common control channel for transmitting channel assignment information for both UL and DL transmissions simultaneously.

FIG. 1 is a block diagram of a system 100 for supporting UL and DL operations in accordance with the present invention. The system 100 includes an RNC 102, a Node-B 104, and a WTRU 106. The Node-B 104 is controlled by the RNC 102, and dynamically allocates radio resources for both UL and DL transmissions from and to the WTRU 106. Three channels are established between the Node-B 104 and the WTRU 106. The channels are a DL channel 108, a UL channel 110, and a common control channel 112. The common control channel 112 is utilized for transmission of channel assignment information for both UL and DL transmissions.

The Node-B 104 is configured to support an HSDPA and EU operation. Therefore, each Node-B 104 dynamically allocates radio resources for DL and UL transmissions to and from the WTRU 106 through an HS-DSCH and an EU channel, respectively. The radio resources assignment information for both the HS-DSCH and the EU is transmitted through the common control channel 112.

In accordance with the present invention, the common control channel 112 is utilized for the transmission of radio resources assignment information for both UL and DL transmissions and a specific indication is provided to distinguish whether the radio resource assignment is for either UL or DL transmission. Therefore, the common control channel 112 occupies a shared DL radio resource space, as defined by a set of SF=128 channelization codes, for both DL and UL transmissions simultaneously, and the WTRU 106 is configured to recognize whether a particular transmission is intended for assigning radio resources for the DL or the UL transmissions.

Figure 2:
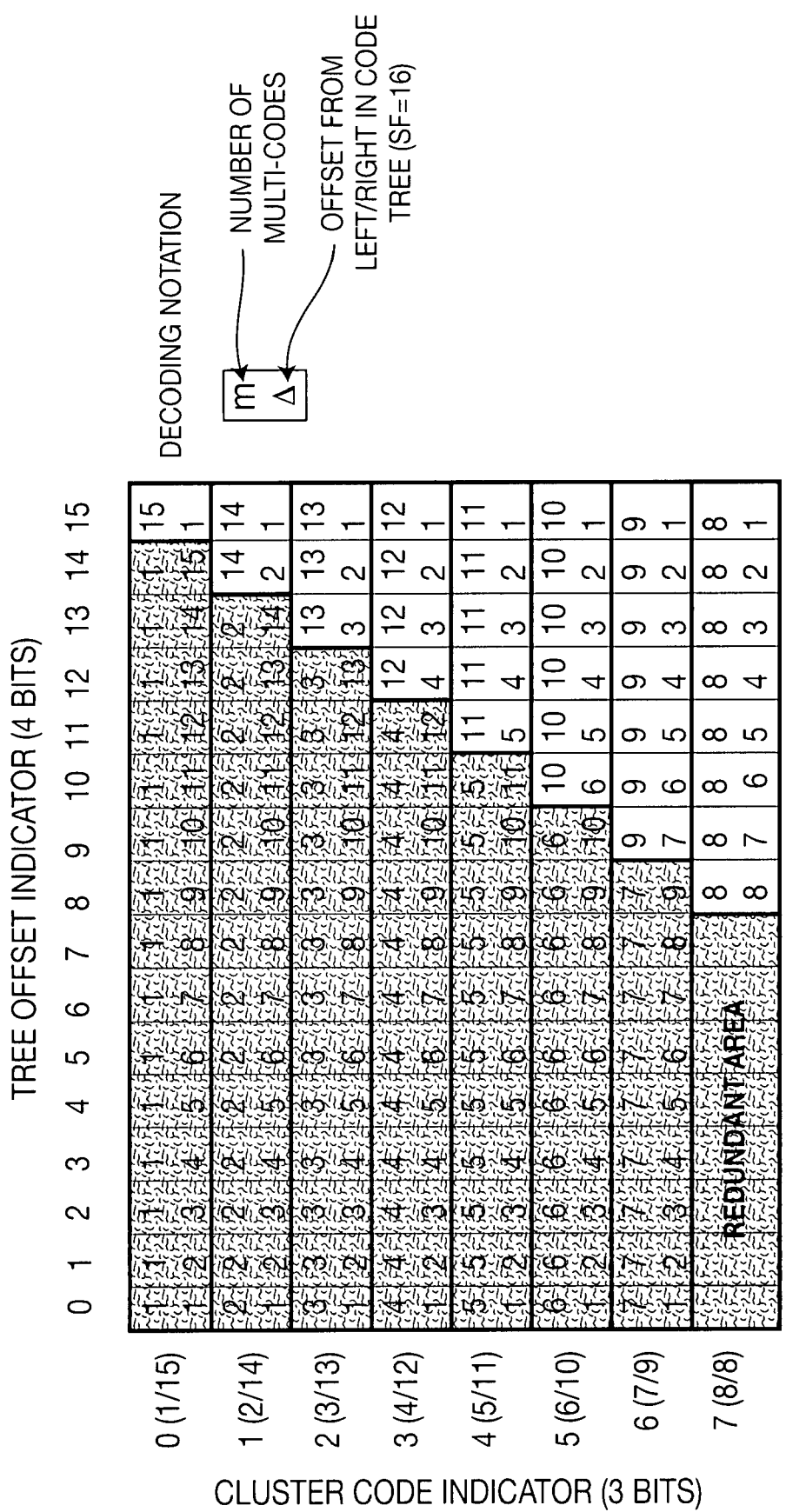
FIG. 2 is a look-up table for channelization code set mapping in an HSDPA, which is utilized in conjunction with the system of FIG. 1.

In accordance with a first embodiment of the present invention, an indication that a particular radio resource is assigned for a UL transmission is provided by means of one or more of the impossible combinations in the channelization code set mapping in a current HSDPA. FIG. 2 is a look-up table for channelization code set mapping currently used in the HSDPA. An HS-SCCH uses seven (7) bits to inform the WTRU 106 which SF=16 channelization codes are used for the corresponding HS-DSCH. Out of the 128 possible combinations, eight (8) combinations are not currently used in an HSDPA (see the labeled "redundant area" in FIG. 2). One or more of the eight (8) unused combinations is used for assigning radio resources or indicating that the demodulated transmission is for UL transmission, not DL transmission. Therefore, if the WTRU 106 determines that a channelization-code-set corresponds to one of the impossible combinations of FIG. 2, the WTRU 106 recognizes that the transmission is for assignment of radio resources for UL transmission, rather than DL transmission, or that the codes corresponding to the channelization-code-set are assigned to UL transmissions.

In accordance with a second embodiment of the present invention, an indication that a particular radio resource is assigned for UL transmission is provided by means of a WTRU-specific CRC. Under current HSDPA specifications, a WTRU-specific CRC is contained in an HS-SCCH field 2. A 16-bit CRC is computed from the information to be transmitted, and the computed CRC is masked with a unique 16-bit WTRU identity (ID). The masked CRC is transmitted to a WTRU 106 as a WTRU-specific CRC.

In accordance with the second embodiment of the present invention, this WTRU-specific CRC is modified in a unique and deterministic way to indicate that the demodulated transmission is for UL transmission, rather than DL transmission. For example, a WTRU-specific CRC computed for an HSDPA is inverted for an EU before performing a channel coding. A WTRU 106 performs two (2) different comparisons, preferably simultaneously, in performing a CRC of the received transmission. If the WTRU 106 succeeds in decoding the received transmission with a WTRU-specific CRC, the WTRU 106 recognizes that the transmission is intended for an HSDPA, and if the WTRU 106 succeeds in decoding the received transmission with an inverted WTRU-specific CRC, the WTRU 106 recognizes that the transmission is intended for an EU.

In accordance with a third embodiment of the present invention, an indication that a particular radio resource is assigned for an EU is provided by means of a WTRU-specific masking sequence. Under current HSDPA specifications, a 40-bit sequence of field 1 is masked with a 40-bit WTRU-specific intermediate code sequence which is generated from a 16-bit WTRU ID.

In accordance with the third embodiment, the WTRU-specific masking on field 1 is modified in a unique and deterministic way to indicate that a transmission is intended for an EU, not for an HSDPA. For example, the inverted 16-bit CRC generated in the second embodiment may be used to derive the 40-bit long masking sequence. If the WTRU 106 succeeds in decoding the received transmission with a WTRU-specific masking sequence, the WTRU 106 recognizes that the transmission is intended for an HSDPA, and if the WTRU 106 succeeds in decoding the received transmission with an inverted WTRU-specific masking sequence, the WTRU 106 recognizes that the transmission is intended for an EU.

With this method, the WTRU 106 can make the distinction whether an EU or an HSDPA channel assignment has been transmitted after having received only field 1 of the HS-SCCH transmission.

Alternatively, WTRU IDs are allocated by the network in such a way that a particular WTRU ID does not collide with another WTRU ID. For example, a first WTRU's inverted ID for EU may be used to indicate a second WTRU's HSDPA service. Therefore, simultaneous detection of presence of a UL resource assignment channel and an HS-SCCH is facilitated.

In accordance with a fourth embodiment of the present invention, an indication that a particular radio resource is assigned for an EU is provided by means of radio resource control (RRC) context signaling. Preferably, a Node-B 104 allocates separate radio resources for transmission of UL radio resources assignment and DL radio resources assignment. Alternatively, an RNC 102 allocates separate radio resources for transmission of UL radio resources assignment and DL radio resources assignment by using RRC signaling messages.

For example, an RRC signaling message from the RNC 102 may inform a WTRU 106 in which TTIs to expect an HS-SCCH or a UL resource assignment channel. Under current R5 HSDPA specifications, fifteen (15) time slots include one (1) frame, and three (3) time slots include one (1) TTI. "Even" TTIs may include, for example, time slots 2, 4, 6, 8, 10, 12 and 14, and "odd" TTIs may include, for example, time slots 1, 3, 5, 7, 9, 11, 13 and 15.

In accordance with the present invention, an RRC transmits signals indicating that a transmission in "even" TTIs is for an HS-SCCH and a transmission in "odd" TTIs is for a UL resource assignment channel. By not allowing a transmission for an HS-SCCH to be transmitted in "odd" TTIs, backwards compatibility with R5 WTRUs can be ensured. The same set of SF=128 resources can be used for an HS-SCCH and a UL resource assignment channel.

In accordance with a fifth embodiment of the present invention, an indication that a particular radio resource is assigned for an EU is provided by means of layer 1 indication on an associated DL dedicated channel (DCH). One or more bits on the associated DL DCH are used to indicate imminent occurrence of a UL resource assignment channel as opposed to an HS-SCCH by means of a fixed and pre-determined timing relationship.

Figure 3:
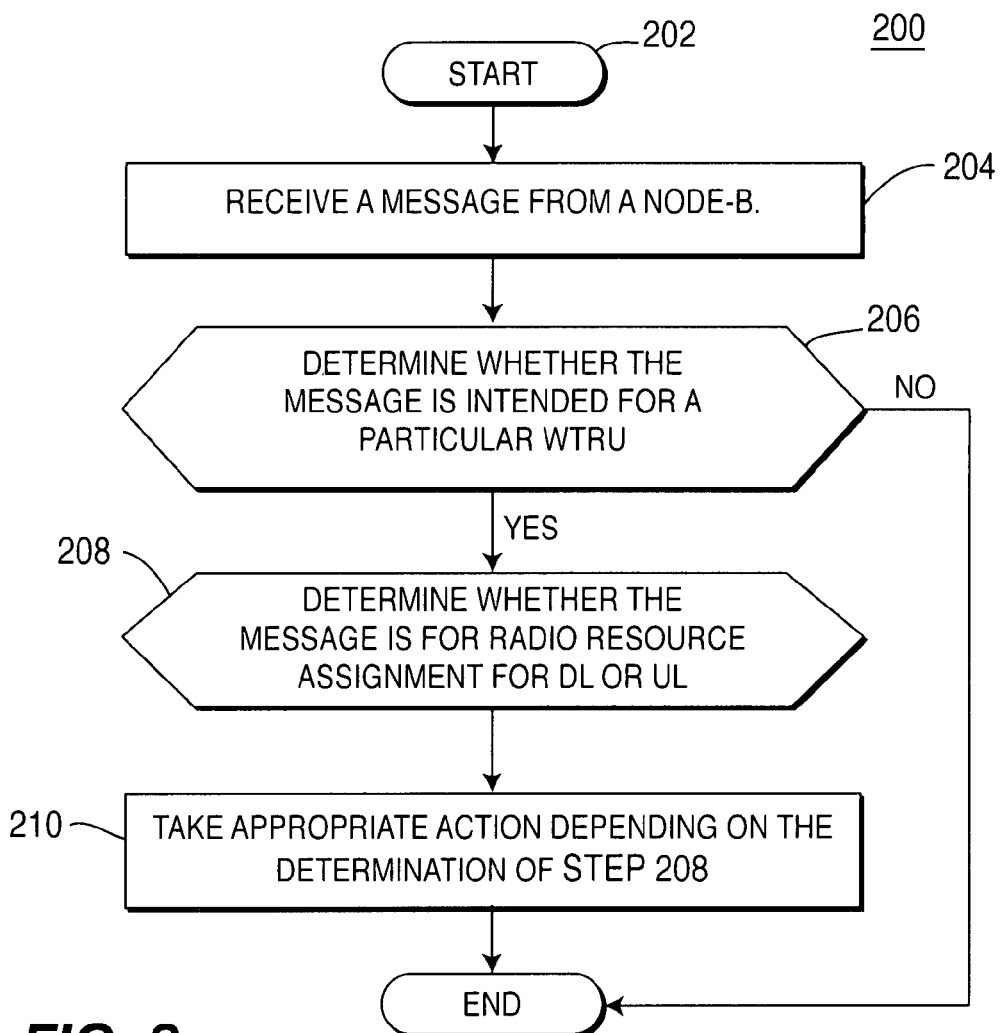
FIG. 3 is a flowchart of a process including method steps for implementing uplink channel assignment signaling in accordance with the present invention.

FIG. 3 is a flowchart of a process 200 including method steps for implementing UL channel assignment signaling in accordance with the present invention. After the process 200 is initiated (step 202), a message for radio resource assignment is transmitted via a common control channel from a Node-B 104 to a WTRU 106. The WTRU 106 receives and demodulates the message using predetermined codes every predetermined TTI, for example, every 2 ms (step 204). The WTRU 106 then determines if the message is intended for the WTRU 106 (step 206). A WTRU-specific CRC may be utilized for this purpose. If the WTRU 106 determines that the message is intended for the WTRU 106, the WTRU 106 determines whether the message is for the assignment of radio resources for DL transmission or UL transmission implementing one of the embodiments of the present invention described above (step 208). The WTRU 106 then takes appropriate actions (step 210) depending on the decision in step 208 to receive or transmit data packet via DL or UL channels. For example, the WTRU 106 may recognize exactly when to initialize a data reception procedure via the DL channel 108 or when to initialize a data transmission procedure via the UL channel 110. Currently, an HS-SCCH for an HSDPA announces an incoming data packet for the WTRU with a fixed two (2) slot offset, whereas the present invention can inform the WTRU when it has an opportunity to transmit a packet via the UL, (e.g., four slots from now).

While this invention has been particularly shown and described with reference to preferred embodiments, it will be understood by those skilled in the art that various changes in form and details may be made therein without departing from the scope of the invention described hereinabove.

What is claimed is:

1. A method for utilizing channel assignment information for an uplink shared channel or a downlink shared channel, the method comprising:

a wireless transmit/receive unit (WTRU) receiving downlink control information including downlink or uplink channel assignment information via a same physical downlink control channel, both downlink channel assignment information and uplink channel assignment information being received via the same physical downlink control channel;

the WTRU determining whether the downlink control information is intended for the WTRU based on WTRU identity (ID)-masked cyclic redundancy check (CRC) parity bits, and if so determining whether the channel assignment information is for assigning radio resources for the uplink shared channel or the downlink shared channel; and the WTRU utilizing the radio resources for the uplink shared channel or the downlink shared channel.

2. The method of claim 1, wherein the WTRU ID-masked CRC parity bits are derived from a sixteen bit CRC.

3. The method of claim 1, wherein the downlink control information includes modulation and coding scheme information.

4. The method of claim 1, wherein the downlink control information includes a new data indicator.

5. The method of claim 1, wherein the downlink control information includes a redundancy version.

6. The method of claim 1, wherein the downlink control information includes hybrid automatic repeat request (H-ARQ) information.

7. The method of claim 1, wherein the physical downlink control channel is a common channel.

8. The method of claim 1, wherein the physical downlink control channel carries both downlink and uplink channel assignment information simultaneously.

9. The method of claim 1, wherein the downlink control information indicates whether the channel assignment information is for the uplink shared channel or the downlink shared channel.

10. The method of claim 1, wherein the determination of whether the channel assignment information is for assigning radio resources for the uplink shared channel or the downlink shared channel is based on the WTRU ID-masked CRC parity bits.

11. The method of claim 1, wherein the determination of whether the channel assignment information is for assigning radio resources for the uplink shared channel or the downlink shared channel is based on a WTRU-specific masking sequence.

12. The method of claim 1, wherein the determination of whether the channel assignment information is for assigning radio resources for the uplink shared channel or the downlink shared channel is based on radio resource control (RRC) signaling.

13. The method of claim 1, wherein the determination of whether the channel assignment information is for assigning radio resources for the uplink shared channel or the downlink shared channel is based on a transmit time interval.

14. The method of claim 1, wherein the determination of whether the channel assignment information is for assigning radio resources for the uplink shared channel or the downlink shared channel is based on at least one of the WTRU ID-masked CRC parity bits, a WTRU-specific masking sequence, radio resource control (RRC) signaling, or a transmit time interval.

15. The method of claim 1 wherein the downlink channel assignment information is carried in one time interval and the uplink channel assignment information is carried in another time interval.

16. A wireless transmit/receive unit (WTRU) for utilizing channel assignment information for an uplink shared channel or a downlink shared channel, the WTRU comprising:

a receiver configured to receive downlink control information including downlink or uplink channel assignment information via a same physical downlink control channel, both downlink channel assignment information and uplink channel assignment information being received via the same physical downlink control channel; and a controller configured to determine whether the downlink control information is intended for the WTRU based on WTRU identity (ID)-masked cyclic redundancy check (CRC) parity bits and to determine whether the channel assignment information is for assigning radio resources for the uplink shared channel or the downlink shared channel, and utilizing the radio resources for the uplink shared channel or the downlink shared channel.

17. The WTRU of claim 16, wherein the WTRU ID-masked CRC parity bits are derived from a sixteen bit CRC.

18. The WTRU of claim 16, wherein the downlink control information includes modulation and coding scheme information.

19. The WTRU of claim 16, wherein the downlink control information includes a new data indicator.

20. The WTRU of claim 16, wherein the downlink control information includes a redundancy version.

21. The WTRU of claim 16, wherein the downlink control information includes hybrid automatic repeat request (H-ARQ) information.

22. The WTRU of claim 16, wherein the physical downlink control channel is a common channel.

23. The WTRU of claim 16, wherein the physical downlink control channel carries both downlink and uplink channel assignment information simultaneously.

24. The WTRU of claim 16, wherein the downlink control information indicates whether the channel assignment information is for the uplink shared channel or the downlink shared channel.

25. The WTRU of claim 16, wherein the determination of whether the channel assignment information is for assigning radio resources for the uplink shared channel or the downlink shared channel is based on the WTRU ID-masked CRC parity bits.

26. The WTRU of claim 16, wherein the determination of whether the channel assignment information is for assigning radio resources for the uplink shared channel or the downlink shared channel is based on a WTRU-specific masking sequence.

27. The WTRU of claim 16, wherein the determination of whether the channel assignment information is for assigning radio resources for the uplink shared channel or the downlink shared channel is based on radio resource control (RRC) signaling.

28. The WTRU of claim 16, wherein the determination of whether the channel assignment information is for assigning radio resources for the uplink shared channel or the downlink shared channel is based on a transmit time interval.

29. The WTRU of claim 16, wherein the determination of whether the channel assignment information is for assigning radio resources for the uplink shared channel or the downlink shared channel is based on at least one of the WTRU ID-masked CRC parity bits, a WTRU-specific masking sequence, radio resource control (RRC) signaling, or a transmit time interval.

30. The WTRU of claim 16 wherein the downlink channel assignment information is carried in one time interval and the uplink channel assignment information is carried in another time interval.

31. A Node-B for selectively providing channel assignment information to a wireless transmit/receive unit (WTRU) for an uplink shared channel and or a downlink shared channel, the Node-B comprising:

a scheduler for generating configured to generate channel assignment information to assign radio resources to the WTRU for the uplink shared channel and or the downlink shared channel; and a transmitter for transmitting configured to transmit downlink control information including uplink or downlink channel assignment information and WTRU identity (ID)-masked cyclic redundancy check (CRC) parity bits to the WTRU via a same physical downlink control channel, both downlink channel assignment information and uplink channel assignment information being transmitted via the same physical downlink control channel, the downlink control information including an indication indicating whether the channel assignment information is for assigning the radio resources for the uplink shared channel or the downlink shared channel.

32. The Node-B of claim 31, wherein the WTRU ID-masked CRC parity bits are derived from a sixteen bit CRC.

33. The Node-B of claim 31, wherein the downlink control information includes modulation and coding scheme information.

34. The Node-B of claim 31, wherein the downlink control information includes a new data indicator.

35. The Node-B of claim 31, wherein the downlink control information includes a redundancy version.

36. The Node-B of claim 31, wherein the downlink control information includes hybrid automatic repeat request (H-ARQ) information.

37. The Node-B of claim 31, wherein the physical downlink control channel is a common channel.

38. The Node-B of claim 31, wherein the physical downlink control channel carries both downlink and uplink channel assignment information simultaneously.

39. The Node-B of claim 31, wherein the indicating whether the channel assignment information is for assigning the radio resources for the uplink shared channel or downlink shared channel is based on the WTRU ID-masked CRC parity bits.

40. The Node-B of claim 31, wherein the indicating whether the channel assignment information is for assigning the radio resources for the uplink shared channel or downlink shared channel is based on a WTRU-specific masking sequence.

41. The Node-B of claim 31, wherein the indicating whether the channel assignment information is for assigning the radio resources for the uplink shared channel or downlink shared channel is based on radio resource control (RRC) signaling.

42. The Node-B of claim 31, wherein the indicating whether the channel assignment information is for assigning the radio resources for the uplink shared channel or downlink shared channel is based on a transmit time interval.

43. The Node-B of claim 31, wherein the indicating whether the channel assignment information is for assigning the radio resources for the uplink shared channel or downlink shared channel is based on at least one of the WTRU ID-masked CRC parity bits, a WTRU-specific masking sequence, radio resource control (RRC) signaling, or a transmit time interval.

44. The Node-B of claim 31 wherein the downlink channel assignment information is carried in one time interval and the uplink channel assignment information is carried in another time interval.

45. A method for providing channel assignment information for an uplink shared channel or a downlink shared channel via a downlink control channel, the method comprising:

a Node B generating channel assignment information to assign radio resources to a wireless transmit/receive unit (WTRU) for the uplink shared channel or the downlink shared channel; and the Node B transmitting downlink control information including uplink or downlink channel assignment information and WTRU identity (ID)-masked cyclic redundancy check (CRC) parity bits to the WTRU via a same physical downlink control channel, both downlink channel assignment information and uplink channel assignment information being transmitted via the same physical downlink control channel, the downlink control information including an indication indicating whether the channel assignment information is for assigning the radio resources for the uplink shared channel or the downlink shared channel.

46. The method of claim 45, wherein the WTRU ID-masked CRC parity bits are derived from a sixteen bit CRC.

47. The method of claim 45, wherein the downlink control information includes modulation and coding scheme information.

48. The method of claim 45, wherein the downlink control information includes a new data indicator.

49. The method of claim 45, wherein the downlink control information includes a redundancy version.

50. The method of claim 45, wherein the downlink control information includes hybrid automatic repeat request (H-ARQ) information.

51. The method of claim 45, wherein the physical downlink control channel is a common channel.

52. The method of claim 45, wherein the physical downlink control channel carries both downlink and uplink channel assignment information simultaneously.

53. The method of claim 45, wherein the indicating whether the channel assignment information is for assigning the radio resources for the uplink shared channel or downlink shared channel is based on the WTRU ID-masked CRC parity bits.

54. The method of claim 45, wherein the indicating whether the channel assignment information is for assigning the radio resources for the uplink shared channel or downlink shared channel is based on a WTRU-specific masking sequence.

55. The method of claim 45, wherein the indicating whether the channel assignment information is for assigning the radio resources for the uplink shared channel or downlink shared channel is based on radio resource control (RRC) signaling.

56. The method of claim 45, wherein the indicating whether the channel assignment information is for assigning the radio resources for the uplink shared channel or downlink shared channel is based on a transmit time interval.

57. The method of claim 45, wherein the indicating whether the channel assignment information is for assigning the radio resources for the uplink shared channel or downlink shared channel is based on at least one of the WTRU ID-masked CRC parity bits, a WTRU-specific masking sequence, radio resource control (RRC) signaling, or a transmit time interval.

58. The method of claim 45 wherein the downlink channel assignment information is carried in one time interval and the uplink channel assignment information is carried in another time interval.

* * * * *

UNITED STATES PATENT AND TRADEMARK OFFICE
CERTIFICATE OF CORRECTION

PATENT NO.        : 7,941,151 B2
APPLICATION NO.   : 11/709970
DATED             : May 10, 2011
INVENTOR(S)       : Rudolf et al.

It is certified that error appears in the above-identified patent and that said Letters Patent is hereby corrected as shown below:

ON THE TITLE PAGE

Item (75) "Inventors:" delete "Phillip" and insert --Philip--.

Item (63) "Related U.S. Application Data", delete "10/902,704" and insert --10/902,740--.

Item (56) U.S. PATENT DOCUMENTS, page 2, left column, after "2004/0043783 A1 3/2004 Anderson", delete "2004/0085939 A1 5/2004 Boumendil et al.".

Item (56) FOREIGN PATENT DOCUMENTS, page 2, left column, after "EP 1248476 10/2002", delete "EP 1324500 12/2002".

Item (56) FOREIGN PATENT DOCUMENTS, page 2, left column, after "GB 2382956 12/2001", delete "GB 2383956 12/2001".

Item (56) FOREIGN PATENT DOCUMENTS, page 2, left column, after "TW 276382 5/1996", delete "TW 276382 9/2005".

Item (56) OTHER PUBLICATIONS, page 2, left column, after "R1-02-1277," delete "Noika," and insert --Nokia,--.

Item (56) OTHER PUBLICATIONS, page 2, right column, after "WGI Meeting 22, (Aug. 2001) available at http://www", delete ".3goo." and insert --.3gpp.--.

Item (56) OTHER PUBLICATIONS, page 3, right column, after "(Release 5)," 3GPP TS", delete "25.212" and insert --25.222--.

Signed and Sealed this
Twenty-seventh Day of December, 2011

David J. Kappos
*Director of the United States Patent and Trademark Office*

CERTIFICATE OF CORRECTION (continued)
U.S. Pat. No. 7,941,151 B2

IN THE SPECIFICATION

At column 1, line 10, after "Ser. No." delete "10/902,704" and insert --10/902,740--.

IN THE CLAIMS

At Claim 31, column 7, line 64, after "Node-B for", delete "selectively".

At Claim 31, column 7, line 66, after "shared channel", delete "and".

At Claim 31, column 8, line 1, after "a scheduler" delete "for generating".

At Claim 31, column 8, line 3, after "shared channel", delete "and".

At Claim 31, column 8, line 5, after "a transmitter", delete "for transmitting".